No. 634,366. Patented Oct. 3, 1899.
G. H. NUNGEZER.
VINE CUTTING ATTACHMENT FOR PLOWS.
(Application filed July 14, 1899.)
(No Model.)

WITNESSES:

INVENTOR
G. H. Nungezer
BY
ATTORNEYS

THE NORRIS PETERS CO., PHOTO-LITHO., WASHINGTON, D. C.

UNITED STATES PATENT OFFICE.

GEORGE H. NUNGEZER, OF POOLER, GEORGIA.

VINE-CUTTING ATTACHMENT FOR PLOWS.

SPECIFICATION forming part of Letters Patent No. 634,366, dated October 3, 1899.

Application filed July 14, 1899. Serial No. 723,809. (No model.)

*To all whom it may concern:*

Be it known that I, GEORGE H. NUNGEZER, of Pooler, in the county of Chatham and State of Georgia, have invented a new and Improved Vine-Cutting Attachment for Plows, of which the following is a full, clear, and exact description.

The object of the invention is to provide an attachment for plows especially adapted for cutting sweet-potato vines in advance of the plow in order that the vines may be cleanly and readily severed and satisfactorily plowed under and the beds simultaneously sided or hilled and made ready for digging or plowing out.

A further object of the invention is to provide an attachment of the character specified that may be expeditiously and conveniently attached to any plow-beam.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
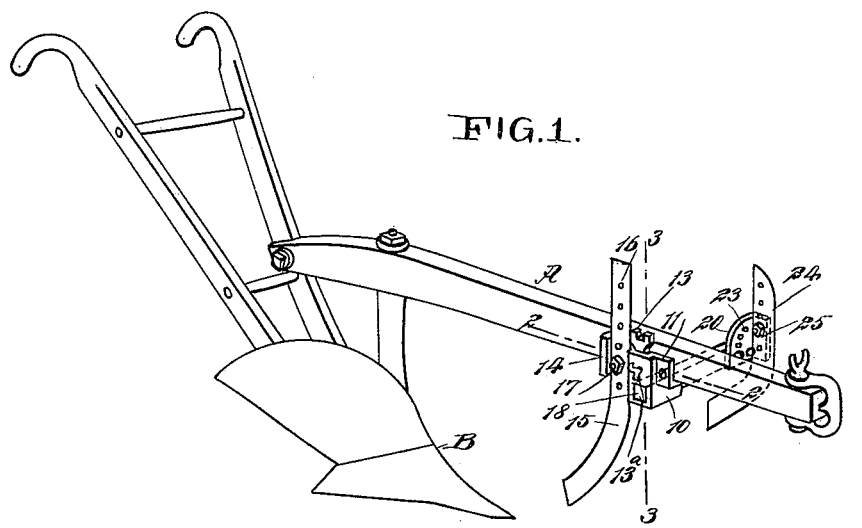
Figures 2, 3:
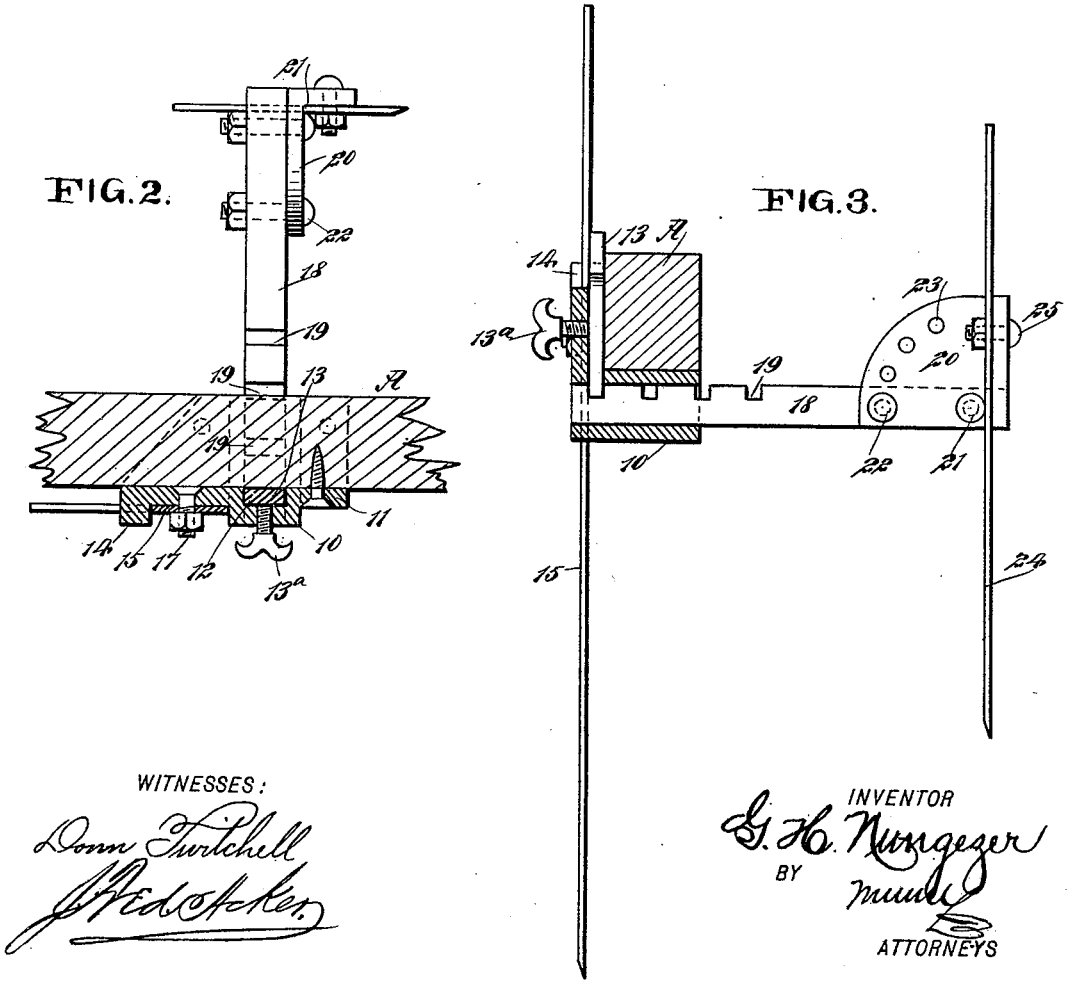

Figure 1 is a perspective view of a plow and the improved attachment applied thereto. Fig. 2 is a sectional plan view of the attachment, the beam appearing in horizontal section and the section being on the line 2 2 in Fig. 1; and Fig. 3 is a vertical section taken substantially on the line 3 3 of Fig. 1.

The attachment consists of a box-casing 10, open at each end and provided with an upper wing 11, extending beyond each side of the box-casing, which wing is adapted to be secured in any suitable or approved manner to the right-hand side of the plow-beam A between the clevis and the share B. An offset is made in the wing 11 of the box-casing just above the casing, and in this offset portion of the wing a vertical groove or channel 12 is produced adapted to receive a locking-slide or latch-bar 13, which slide is adapted to enter the box-casing at its lower end.

A vertical flange 14 is formed at the rear edge of the wing 11 of the box-casing 10, and in the space between the said flange 14 and the offset in the wing a knife-colter 15 is adjustably secured, said knife-colter being curved in a rearward direction, and the knife-colter 15 is provided with apertures 16 in its shank, through either of which a bolt 17 may be passed and carried through the beam, thus securing said knife-colter to the said wing 11. The knife-colter 15 should be long enough to reach the furrows between the beds when the plow is at work in the side of a bed.

One end of a connecting-bar 18 is made to enter the box-casing 10 of the attachment, the said connecting-bar being ordinarily below the plow-beam A, and the connecting-bar extends beyond the left-hand side of the plow-beam. The connecting-bar 18 is adjustable and to that end is provided with recesses 19 in its upper surface, in any of which recesses the lower end of the locking-slide 13 is adapted to enter. The slide is held in its adjusted position by a set-screw $13^a$ or its equivalent.

At the left-hand end of the connecting-bar 18 an angle-plate 20 is located on the front face of said connecting-bar, and this angle-plate is attached to the connecting-bar by a pivot-bolt 21. A bolt 22 is adapted to pass through any one of a series of apertures 23, produced in said angle-plate, as shown in Figs. 1 and 3. Under such a construction it is evident that the angle-plate may be held in a vertical position or may be inclined, as occasion may demand.

A knife 24 is attached to the inner face of the outer member of the angle-plate 20, said knife 24 being provided with apertures in its upper portion, through which a fastening-bolt 25 is passed. Thus it will be observed that the knife 24 may be adjusted to engage with the vines of high or low beds. The knife 24 is rearwardly curved at its lower end and is shorter than the colter-knife 15 at the right-hand side of the plow-beam, and, furthermore, the cutting edge of the shorter or left-hand knife 24 extends from top to bottom, so that it will effectually and cleanly cut any of the vines with which it may come in contact. The knives run just deep enough to cut the potato-vines at and above the surface of the beds. It will be observed that the left-hand knife is far enough removed from the beam A to prevent the vines choking said left-hand knife and that the two knives effectually prevent the vines from tending to clog the plowshare.

Having thus described my invention, I claim as new and desire to secure by Letters Patent—

1. A vine-cutting attachment for plows, consisting of a support, and knives carried by the ends of said support, the said support being adapted for attachment to the plow-beam, for the purpose described.

2. A vine-cutting attachment for plows, consisting of an adjustable support, knives adjustable at the end portions of said support, the knives being rearwardly curved at their lower ends, and said support being adapted for attachment to a plow-beam, as and for the purpose set forth.

3. A vine-cutting attachment for plows, consisting of an adjustable support, knives adjustably carried by said support at its ends, the lower portions of the knives being rearwardly curved and one knife being shorter than the other, the end of the support carrying the longer knife being arranged for engagement with the right-hand side of a plow-beam, for the purpose specified.

4. A vine-cutting attachment for plows, consisting of a box-casing and a connecting-bar held to slide in said casing, a locking device for the connecting-bar, an adjustable support located at the left-hand portion of the connecting-bar, a colter-knife carried by an extension of the box-casing, and a shorter knife carried by said adjustable support, the shorter knife having a cutting edge extending from one end to the other and both of the knives having their lower ends curved to the rear, for the purpose specified.

GEORGE H. NUNGEZER.

Witnesses:
G. H. CATHCART,
J. F. COLLINS.